April 27, 1943.    J. H. SHERTS    2,317,945
BULLET RESISTANT GLAZING UNIT
Filed Oct. 10, 1940

Inventor
JAMES H. SHERTS

By    Olen E. Bee
Attorney

Patented Apr. 27, 1943

2,317,945

UNITED STATES PATENT OFFICE 2,317,945

BULLET RESISTANT GLAZING UNIT

James Hervey Sherts, Pittsburgh, Pa., assignor to Pittsburgh Plate Glass Company, Allegheny County, Pa., a corporation of Pennsylvania Application October 10, 1940, Serial No. 360,579

3 Claims. (Cl. 109—58.5)

The present invention relates to vehicular glazing and more particularly to a bullet resistant glazing unit.

One object of the present invention is the provision of a glazing unit which will exhibit increased resistance to missile penetration.

A further object of the invention is to provide a glazing unit, in which two glass panels, neither of which is of sufficient strength alone to withstand the impact of a bullet, are combined to resist penetration of bullets commonly employed in warfare.

Other objects and advantages of the invention will become more apparent from the following detailed description of a preferred embodiment thereof.

Laminated glass comprising a plurality of glass plates united by intermediate layers of thermoplastic material has been used heretofore for vehicular glazing. By increasing the number of laminae in the composite unit and the thickness of the several glass plates contained therein, it has been possible to produce a laminated glass through which a bullet of light or medium caliber would not penetrate.

More recently, however, the size of armament employed particularly in aerial warfare has been enlarged and the combination of heavier missiles and higher velocities have negatived the value of the so-called "bullet-proof" glasses. It is quite possible to apply additional layers of glass and plastic to the composite plates and in this way build up their resistance to the bullet impact, but a plate of this nature would be highly impractical. Not only would it be difficult to mount in a supporting frame, but its weight would constitute a serious factor, further precluding its use in aircraft. Another disadvantage of a very thick laminated plate is the lowered degree of visibility therethrough.

Briefly stated the present invention contemplates the formation of a bullet resistant glazing unit in which a laminated glass panel of insufficient strength to withstand the impact of a bullet is given an increased efficiency by the combination therewith of a glass deflector plate, which is so mounted as to deflect the path of a bullet passing therethrough from its normal point of impact upon the laminated glass panel.

Figure 1:
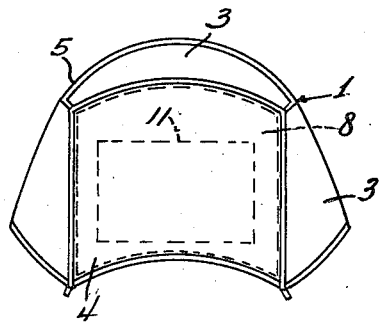
Figure 2:
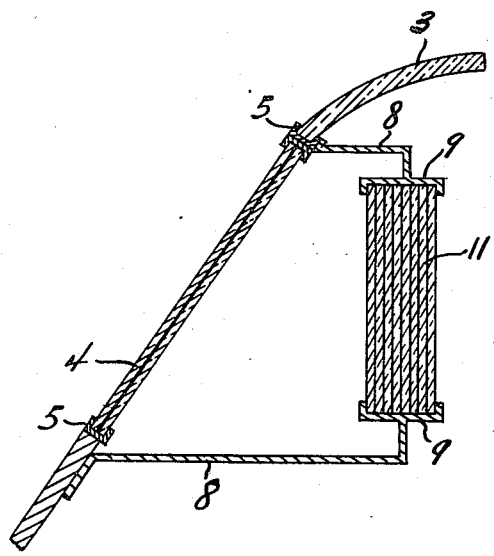

In the drawing Figure 1 is a fragmentary front elevational view of the cockpit housing of an airplane embodying my invention and Figure 2 is a vertical sectional view thereof.

Referring to the drawing a housing 1 projects above the main fuselage portion of an aircraft, to cover the pilot's cockpit. The housing is ordinarily composed of sections 3 of a transparent medium, such as laminated glass, Plexiglass or other synthetic plastic and a central section 4 all of which are united by a suitable framework 5. The central section 4 constitutes the wind screen and is permanently secured to the fuselage, whereas the remaining portion of the housing may be slidable, in order to provide access to the cockpit.

The central section 4, as shown, comprises a plate of laminated glass seated within the framework 5. A single plate of glass may be used in lieu of the laminated plate 4 if it is so desired.

The central section 4 is so arranged that the plate will be inclined from the vertical and in general for a minimum wind resistance is inclined at an angle in excess of 45°. Brackets 8 extending rearwardly of the wind screen are secured to the framework 5 and serve to support a channel 9 which encloses a panel 11 of multiplate laminated glass. The panel 11 is maintained in a substantially vertical position in spaced relation to the wind screen 4. It is of course advantageous that the panel 11 be of the largest possible dimensions, in order that there will be no restriction in the field of vision through the assembly. The brackets 8 may be expanded in size to form a shield around the unit and thus, if constructed of a relatively heavy armor plate, will prevent injury from flying particles of glass.

The panel 11 will ordinarily have a thickness of approximately 3 inches. Even though the panel comprises a plurality of glass plates and intermediate layers of reinforcing material, it does not possess sufficient strength to withstand missile penetration. The plate 4 has a thickness in excess of ⅜ of an inch, and ordinarily a thickness of ½ an inch is sufficient. Obviously a bullet will penetrate easily a plate of this thickness. Furthermore the total thickness of the panel and plate would not be sufficient to resist the impact of a bullet if they were united into a composite unit.

By mounting the plate 4 at an angle of 45 degrees or more from the vertical, a bullet passing therethrough is deflected from its normal path and caused to tumble in its flight. This deflection will be sufficient to insure that the bullet passing through the space from plate 4 to the panel 11 deviates from its ordinary course and from its normal point of impact upon the glass panel. The force of the impact, instead of being centralized at the point of the bullet under which condition its power of penetration is at a maximum, is distributed over a wide area and accordingly the amount of penetration is materially decreased.

It is not necessary that the bullet passing through the plate 4 be deflected to such extent that its body rather than its point impact the panel 11. In fact the high velocities of presently used missiles would preclude this possibility. Nevertheless a slight deviation will produce the desired result and permit the panel 11 to withstand the impact. The degree of forward rotation of the bullet in tumbling may be increased by lengthening the space between the plate 4 and the panel 11. An increase in the thickness of the plate 4 will also cause a greater deviation in the path of the bullet. In either event it will be possible to vary somewhat the thickness of the panel 11.

It will at once be obvious that various other modifications in the formation of the several elements and their arrangement into a unit are possible without departing from the spirit of the invention or the scope of the appended claims.

What I claim is:

1. In an airplane having a bullet resisting pilot compartment, a front sloping glass windshield constituting an outer wall section of the compartment and capable of causing tumbling of a bullet penetrating it, an inner laminated safety glass unit disposed substantially vertically in the compartment behind the windshield at a distance therefrom sufficient to permit tumbling of a bullet penetrating the windshield before it strikes said safety glass unit, and a frame engaging the edges of the unit and supported in said compartment.

2. In an airplane having a pilot compartment, a front laminated glass windshield constituting an outer sloping wall section of the compartment and said windshield being capable of causing tumbling of a bullet penetrating it, an inner laminated safety glass unit thicker than the windshield and disposed substantially vertically in the compartment behind the sloping windshield at a distance therefrom sufficient to permit tumbling of a bullet penetrating the windshield before it strikes said unit, and a frame engaging the edges of said unit and supported in said compartment.

3. In an airplane having a pilot compartment, a front laminated glass windshield sloping at least 45 degrees to the horizontal to constitute an outer sloping wall section of the compartment and said windshield being capable of causing tumbling of a bullet penetrating it, an inner laminated safety glass unit at least three times thicker than the windshield and disposed substantially vertically in the compartment behind the sloping windshield at a distance therefrom sufficient to permit tumbling of a bullet penetrating said windshield before it strikes said unit, and a frame engaging the edges of said unit and supported in said compartment.

JAMES HERVEY SHERTS.